Figure 1:
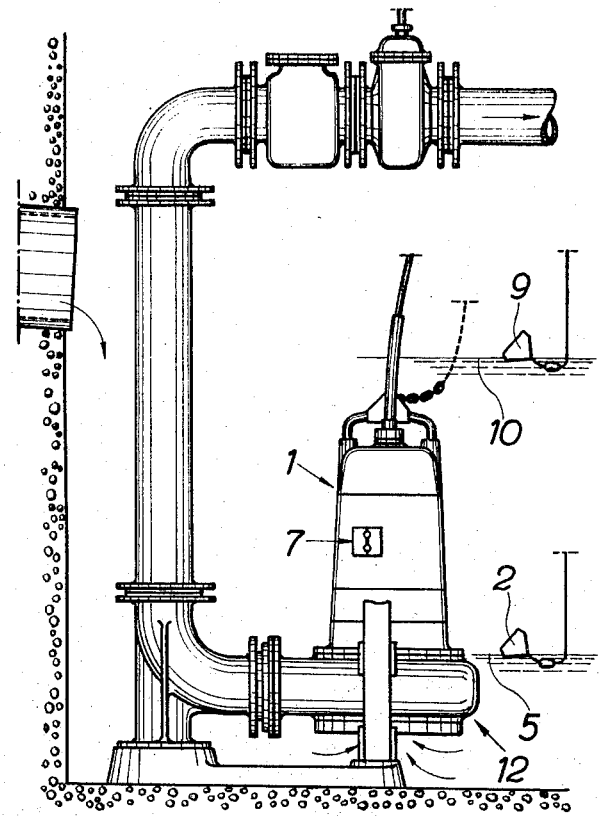

United States Patent [19]
Eskola et al.

[11] 3,759,634
[45] Sept. 18, 1973

[54] METHOD AND DEVICE FOR PROTECTING A PUMP MOTOR INTENDED TO BE IMMERSED IN LIQUID

[75] Inventors: Kai Eskola, Friisala; Yrjö Tyllinen, Helsinki, both of Finland

[73] Assignee: Oy E. Sarlin AB, Kaivoksela, Finland

[22] Filed: Dec. 21, 1971

[21] Appl. No.: 210,522

[30] Foreign Application Priority Data
Nov. 5, 1971  Finland..............................3168

[52] U.S. Cl. .............................................. 417/32
[51] Int. Cl. ............................................ F04b 49/10
[58] Field of Search........................... 417/32, 36, 40

[56] References Cited
UNITED STATES PATENTS

| | | | |
|---|---|---|---|
| 2,589,089 | 3/1952 | Johnson | 417/40 |
| 1,942,241 | 1/1934 | Duhme | 417/32 |
| 2,741,988 | 4/1956 | Merritt | 417/32 |
| 2,946,203 | 7/1960 | Carver | 417/32 |
| 2,975,347 | 3/1961 | Schaefer | 417/32 |
| 3,010,401 | 11/1961 | Granquist | 417/32 |
| 3,667,022 | 5/1970 | Quinn | 417/36 |

*Primary Examiner*—C. J. Husar
*Attorney*—Eric H. Waters et al.

[57] ABSTRACT

The object of the present invention is a method for protecting a pump motor which is submersible in a liquid against excessive heating, in which method at least one means measuring the liquid level height, such as a float, is placed in the liquid to be pumped, in the motor circuit a switch is inserted which is acted upon by the means measuring the liquid level in such manner that the motor circuit is broken when the liquid level descends to a predetermined lower limit height, in the motor circuit an excess current protection means is placed, which breaks the motor circuit if the motor is overloaded, and in connection with the motor a heat sensitive means is provided, which breaks the circuit of the motor if the motor temperature rises to a predetermined value. According to this invention the heat sensitive means completes the motor circuit for its own part when the motor temperature falls below a predetermined value and that in the motor circuit a switch is placed on which a means measuring the liquid level acts so that the motor starts when the liquid level rises to a predetermined upper limit level, if the motor temperature is below a predetermined value.

7 Claims, 2 Drawing Figures

METHOD AND DEVICE FOR PROTECTING A PUMP MOTOR INTENDED TO BE IMMERSED IN LIQUID

When the submersible pump motor unit is in operation the liquid level fluctuates so that the motor will have to run at least part of the time either entirely or partly above the liquid level. Dissipation of heat from the motor is then by air cooling, which is substantially less efficient than when the motor is completely immersed. The motor may be protected against excess heating by dimensioning it for complete air cooling, in which instance even prolonged operation out of the liquid causes no excessive heating of the motor. Such a design is uneconomical however. It is more advantageous to dimension the motor to operate only partially air cooled or with complete air cooling during short periods only. For the eventuality that for one reason or another the motor should have to operate during a prolonged period with air cooling alone, a means is provided in connection with the motor which interrupts the motor circuit if the motor is heated in excess. However, the drawback is then encountered that subsequently a supervising person has to re-start the motor. Automatic starting of the motor by a means operating under the effect of heat cannot be permitted since the motor is rapidly cooled when the liquid level slightly rises, and if now the motor were started, it might once again suffer excessive heating.

The object of the present invention is to provide an advantageous motor design dimensioned for partial air cooling only, which is protected against excessive heating by a heat sensitive means and the operation of which can be acceptably fully automated. The invention is characterized in that the heat sensitive means completes the circuit of the motor for its own part when the motor temperature falls below a predetermined value and in that in the motor circuit a switch is inserted upon which the means measuring the liquid level acts in such manner that the motor starts when the liquid level rises to a predetermined upper limit height, if the motor temperature is below a predetermined value.

By this it is achieved that prior to re-starting the motor the best possible cooling, that is cooling by liquid with complete immersion in the liquid, is ensured for the motor. The probability that the motor would once more heat up in excess is exceedingly small with a method according to the invention.

According to a favourable embodiment, the switch upon which the means measuring the liquid level acts will only start the motor when the liquid level is at a predetermined height.

The invention also concerns a device for carrying out the method, such device comprising at least one means placed in the liquid which measures the liquid level, such as a float, and a switch placed in the motor circuit, upon which the means measuring the liquid level acts in such manner that the motor circuit is broken when the liquid level descends to a predetermined lower limit height, an overcurrent protection means placed in the motor circuit which interrupts the motor circuit if the motor is overloaded, and a heat sensitive means placed in connection with the motor, which interrupts the motor circuit if the motor temperature rises to a predetermined value. The device is characterized in that the heat sensitive means completes the motor circuit for its own part when the motor temperature falls below a predetermined value and that the motor circuit contains a switch upon which the means measuring the liquid level acts so that the motor starts when the liquid level rises to a predetermined upper limit height, if the motor temperature is below a predetermined value.

Figure 2:
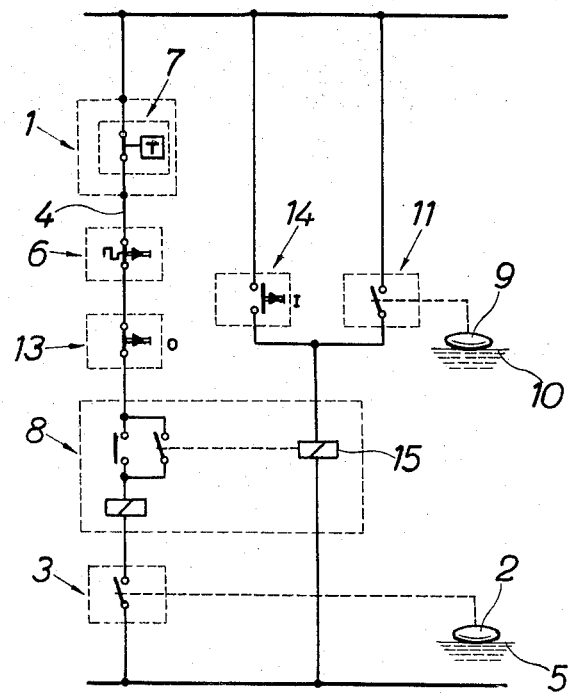

The invention is described in the following by the aid of an example with reference to the attached drawing, wherein FIG. 1 shows a submersible pump motor unit according to the invention, and FIG. 2 shows schematically the circuit connections of the control devices of the pump motor unit of FIG. 1.

In FIG. 1 a pump motor unit has been shown in which the motor 1 has been placed upon the pump 12 with suction intake from below. The pump has been adjusted to operate by the aid of floats 2 and 9 in such manner that the pump starts when the liquid level is at upper limit height 10, and the motor stops when the liquid level falls to the lower limit height 5. In FIG. 2, in the circuit 4 of the motor 1 there have been inserted: a heat sensitive means 7 provided in connection with the motor, an overload protection means 6, a manually operated switch 13 for disconnecting the operation of the pump, a switch 8 which starts the pump motor, and a switch 3 operating under effect of the float 2. The motor is started with a manual switch 14, which supplies a pulse to the control circuit 15 of the switch 8. If then the motor circuit is completed with regard to the other switches, the motor will start. When the liquid level has fallen to the lower limit height 5, the float 2 acts upon the switch 3, which breaks the motor circuit. At the same time the switch 8 is also released. When the liquid level has risen to be above the lower limit height, the switch 3 completes the motor circuit for its own part, but only when the liquid level has risen to its upper limit height 10 is a pulse supplied by the grazing contact 11 into the control circuit 15 of switch 8, and the motor starts once more. If the heat sensitive means 7 placed in connection with the motor interrupts the motor circuit before the liquid level has gone down to the lower linit height 5, the motor stops and, again, the switch 8 is also released. At a rise of the liquid level the motor is cooled in such amount that the heat sensitive means 7 completes the circuit of the motor for its own part. However, for starting the motor a pulse is also needed in the control circuit 15 of the switch 8. This pulse is obtained from the grazing contact 11 when the liquid level reaches upper limit height 10. The operation of the pump continues automatically in this manner.

It is obvious to one skilled in the art that various embodiments of the invention may vary within the scope of the claims presented below. For instance, the design of the pump and motor combination and of its control devices may take different forms. The heat sensitive means may be placed inside the motor or even on the outer wall of the motor housing. The design of the overcurrent protection means and of the heat sensitive means is not fixed either. They may be semiconductors, for instance.

The means measuring the liquid level may be a float as has been set forth in the exemplary case. Such arrangements may then be made that one float stops the motor at the lower limit height of the liquid level and another starts the motor at the upper limit height, or both functions are combined in one float, e.g., by using a mercury switching tube in the float.

For measuring the liquid level electrodes may also be used, for instance.

We claim:

1. A device for protecting a pump motor intended for immersion in a liquid against excessive heating, comprising at least one means placed in the liquid to be pumped and measuring the liquid level, such as a float, a switch included in the circuit of the motor on which the means measuring the liquid level acts so that the motor circuit is interrupted when the liquid level falls to a predetermined lower limit height, an overload protection means placed in the motor circuit, which breaks the motor circuit if the motor is overloaded, and a heat sensitive means provided in connection with the motor, which interrupts the motor circuit if the motor temperature rises to a predetermined value, wherein the improvement comprises that the motor circuit is so formed that the heat sensitive means completes the motor circuit for its own part when the motor temperature again falls below a predetermined value and that the motor circuit includes a switch on which the means measuring the liquid level acts so that the motor starts only when the liquid level is at a predetermined upper limit height, if at the same time the motor temperature is below a predetermined value.

2. Device according to claim 1, characterized in that the switch on which the means measuring the liquid level acts and which starts the motor is a grazing contact.

3. Device according to claim 1, characterized in that the overload protection means is a semiconductor.

4. Device according to claim 1, characterized in that the heat sensitive means protecting the motor against excessive heating is a semiconductor.

5. Device according to claim 1, characterized in that the overload protection means consists of a heat sensitive means.

6. Device according to claim 1, characterized in that the heat sensitive means protecting the motor against excessive heating is slower in operation than the heat sensitive means constituting the overload protection means of the motor.

7. Device according to claim 1, characterized in that the interruption temperature of the heat sensitive means protecting the motor against excessive heating is lower than that of the heat sensitive means constituting the overload protection means of the motor.

* * * * *